United States Patent
Sato et al.

(10) Patent No.: US 7,061,688 B2
(45) Date of Patent: Jun. 13, 2006

(54) ZOOM LENS WITH A VIBRATION-PROOF FUNCTION

(75) Inventors: Kenichi Sato, Ageo (JP); Takashi Tanaka, Kawagoe (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/263,930

(22) Filed: Nov. 2, 2005

(65) Prior Publication Data

US 2006/0092525 A1 May 4, 2006

(30) Foreign Application Priority Data

Nov. 4, 2004 (JP) .............................. 2004-320378

(51) Int. Cl.
*G02B 15/14* (2006.01)

(52) U.S. Cl. ...................... 359/691; 359/557; 359/717; 359/740; 359/793

(58) Field of Classification Search ................ 359/557, 359/691, 717, 689, 716, 740, 784, 793
See application file for complete search history.

(56) References Cited

U.S. PATENT DOCUMENTS

| | | | | |
|---|---|---|---|---|
| 5,179,473 A * | 1/1993 | Yano et al. | .................. | 359/691 |
| 5,644,435 A * | 7/1997 | Shikama | ..................... | 359/691 |
| 5,715,097 A * | 2/1998 | Shibayama et al. | ......... | 359/691 |
| 5,757,555 A * | 5/1998 | Sato | ............................. | 359/684 |
| 5,774,267 A * | 6/1998 | Kodama et al. | ............ | 359/557 |
| 5,781,340 A * | 7/1998 | Suzuki | ........................ | 359/691 |
| 5,793,536 A * | 8/1998 | Sato | ............................. | 359/691 |
| 5,801,887 A * | 9/1998 | Sato | ............................. | 359/691 |
| 5,805,349 A * | 9/1998 | Sato | ............................. | 359/691 |
| 5,969,881 A * | 10/1999 | Konno | ........................ | 359/691 |
| 6,441,967 B1 * | 8/2002 | Furuta | ......................... | 359/691 |
| 6,487,024 B1 * | 11/2002 | Sato | ............................. | 359/691 |
| 6,606,202 B1 * | 8/2003 | Hoshi | ......................... | 359/687 |
| 6,968,128 B1 * | 11/2005 | Itoh | ............................. | 359/691 |
| 6,995,925 B1 * | 2/2006 | Noda | .......................... | 359/691 |

FOREIGN PATENT DOCUMENTS

| | | | | |
|---|---|---|---|---|
| JP | 05011182 A * | 1/1993 | ................. | 359/691 |
| JP | 05034596 A * | 2/1993 | ................. | 359/691 |
| JP | 05119257 A * | 5/1993 | ................. | 359/691 |
| JP | 6-337374 | 12/1994 | | |
| JP | 7-60223 | 6/1995 | | |
| JP | 10-161023 | 6/1998 | | |
| JP | 10-161024 | 6/1998 | | |

* cited by examiner

*Primary Examiner*—Evelyn A. Lester
(74) *Attorney, Agent, or Firm*—Arnold International; Jon W. Henry; Bruce Y. Arnold

(57) ABSTRACT

A zoom lens with a zoom ratio of about three includes a first lens group of negative refractive power that moves along an optical axis during zooming relative to a second lens group of positive refractive power and having a vibration-proof function to correct for hand shaking that causes image blurring. The second lens group includes a first lens subgroup on its object side having positive refractive power and at least one aspheric surface, and a second lens subgroup having positive refractive power. The second lens subgroup is movable in a direction perpendicular to the optical axis of the zoom lens in order to correct for vibration of the zoom lens. The second lens group satisfies a condition regarding the ratio of focal lengths of the two lens subgroups, and the second lens subgroup satisfies a condition regarding its transverse magnification at the telephoto end.

20 Claims, 9 Drawing Sheets

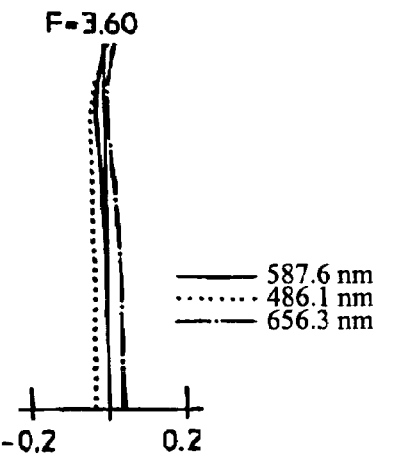
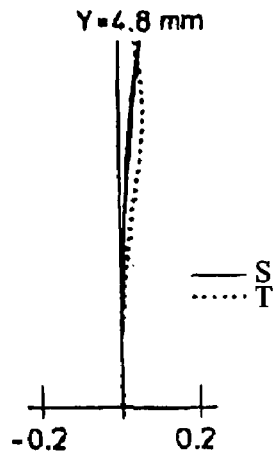
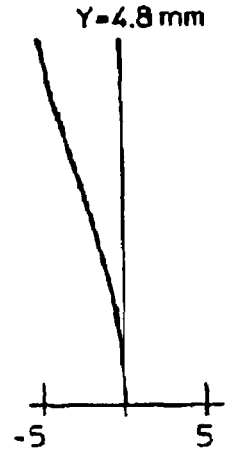
Spherical Aberration
Fig. 4A
Astigmatism
Fig. 4B
Distortion
Fig. 4C
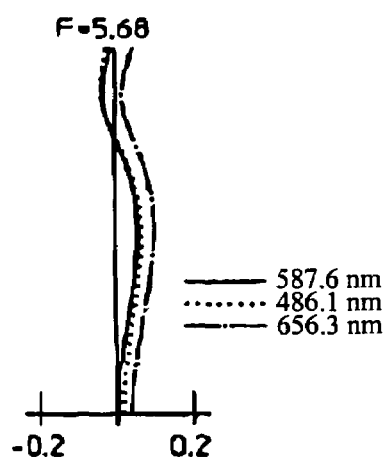
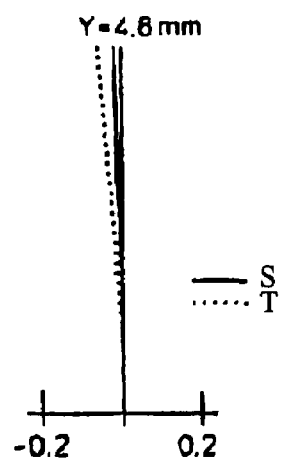
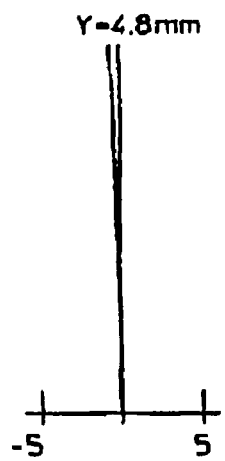
Spherical Aberration
Fig. 5A
Astigmatism
Fig. 5B
Distortion
Fig. 5C Spherical Aberration Astigmatism Distortion Spherical Aberration Astigmatism Distortion Spherical Aberration Astigmatism Distortion Spherical Aberration Astigmatism Distortion

ZOOM LENS WITH A VIBRATION-PROOF FUNCTION

TECHNICAL FIELD OF THE INVENTION

The present invention relates to a zoom lens with a vibration-proof function, specifically, a vibration-proof function that can prevent blurring of an image caused by shaking of the hand as may occur in photographing a subject with a hand-held camera, for example, a digital camera.

BACKGROUND OF THE INVENTION

When photographing a moving object or at a slow shutter speed in hand-held photography, vibration is transmitted to the photographic system from shaking of the hand or hands holding the photographic system. This causes blurring of the photographed picture.

Various optical systems that are known as vibration-proof optical systems have been proposed for the purpose of preventing such blurring of a photographed picture, but many of these optical systems are for use in zoom lenses with a zoom ratio of six or greater with a narrow photographic area and are easily subject to blurring at the telephoto settings.

However, a small and lightweight digital camera with a zoom ratio of about three has recently become popular. Such a digital camera has improved portability due to its small size. However, its small size makes it difficult to hold the camera firmly enough to avoid blurring of photographed pictures due to movement of the camera during photographing.

Additionally, a zoom lens that includes, in order from the object side, a first lens group having negative refractive power and a second lens group having positive refractive power is preferred as the optical system of a digital camera with a zoom ratio of about three, but the smallest f-number at the telephoto end may be as large as about five in many of these zoom lenses, requiring longer exposures and thus increasing the probability of hand shaking causing blurring of the photographs.

In order to address this problem, a zoom lens having two components, positive and negative, has been proposed that moves the entire second lens group in a direction perpendicular to the optical axis of the zoom lens so that the optical axis of the entire second lens group becomes offset from and parallel to the optical axis of the zoom lens in order to correct for shaking of the zoom lens. This defines an eccentric position of the entire second lens group relative to the optical axis of the zoom lens. See, for example, Japanese Laid-Open Patent Application H6-337374 and Japanese Examined Patent Publication H07-060223.

Additionally, a zoom lens having two components, negative and positive, has been proposed that divides the second lens group into a first lens subgroup on the object side having positive refractive power and a second lens subgroup having positive refractive power and moving only the first lens subgroup in a direction perpendicular to the optical axis of the zoom lens so that the optical axis of the first lens subgroup becomes offset from and parallel to the optical axis of the zoom lens in order to correct for shaking of the zoom lens. See, for example, Japanese Laid-Open Patent Application H10-161024.

Furthermore, a zoom lens having two components, negative and positive, has been proposed that divides the second lens group into a first lens subgroup on the object side having positive refractive power and a second lens subgroup having positive refractive power and moving only the second lens subgroup in a direction perpendicular to the optical axis of the zoom lens so that the optical axis of the second lens subgroup becomes offset from and parallel to the optical axis of the zoom lens in order to correct for shaking of the zoom lens. See, for example, Japanese Laid-Open Patent Application H10-161023.

However, the zoom lenses of Japanese Laid-Open Patent Application H6-337374 have problems of a large load of the vibration-proof drive system because the entire second lens group is moved in correcting for shaking that occurs in hand-held operations.

The zoom lenses of Japanese Laid-Open Patent Application H10-161024 have an advantage of a small load of the vibration-proof drive system because only the first lens subgroup of the second lens group moves perpendicular to the optical axis of the zoom lens in order to correct for shaking vibration. However, in the case of an optical system for a digital camera, a shutter unit is frequently mounted on the object side of the second lens group. This creates a problem in the positioning of the vibration-proof drive system provided in the first lens subgroup of the second lens group interfering with the positioning of the shutter unit, thus making this arrangement undesirable.

Similarly, the zoom lenses of Japanese Laid-Open Patent Application H10-161023 have an advantage of a small load of the vibration-proof drive system because only the second lens subgroup of the second lens group moves perpendicular to the optical axis of the zoom lens in order to correct for shaking vibration. However, in the zoom lenses of Japanese Laid-Open Patent Application H10-161023, there has been a problem in that the refractive power of the second lens subgroup relative to the refractive power of the first lens subgroup becomes too large, resulting in deterioration of performance in recent digital cameras that have a large number of pixels and high resolution using solid state image pickup elements, such as a CCD, due to moving the second lens subgroup of the second lens group perpendicular to the optical axis of the zoom lens in order to prevent blurring, even if such performance deterioration is allowable for 35 mm photographic film cameras.

BRIEF SUMMARY OF THE INVENTION

The present invention relates to a zoom lens with a vibration-proof function that provides good optical performance even if a large amount of hand shaking occurs and that reduces the load on the vibration-proof drive system with a compact construction using a relatively lightweight lens group for hand shaking correction.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4C show the spherical aberration, astigmatism, and distortion, respectively, of the zoom lens of Embodiment 1 of the present invention at the wide-angle end;

FIGS. 5A–5C show the spherical aberration, astigmatism, and distortion, respectively, of the zoom lens of Embodiment 1 of the present invention at the telephoto end;

DETAILED DESCRIPTION

Figure 1:
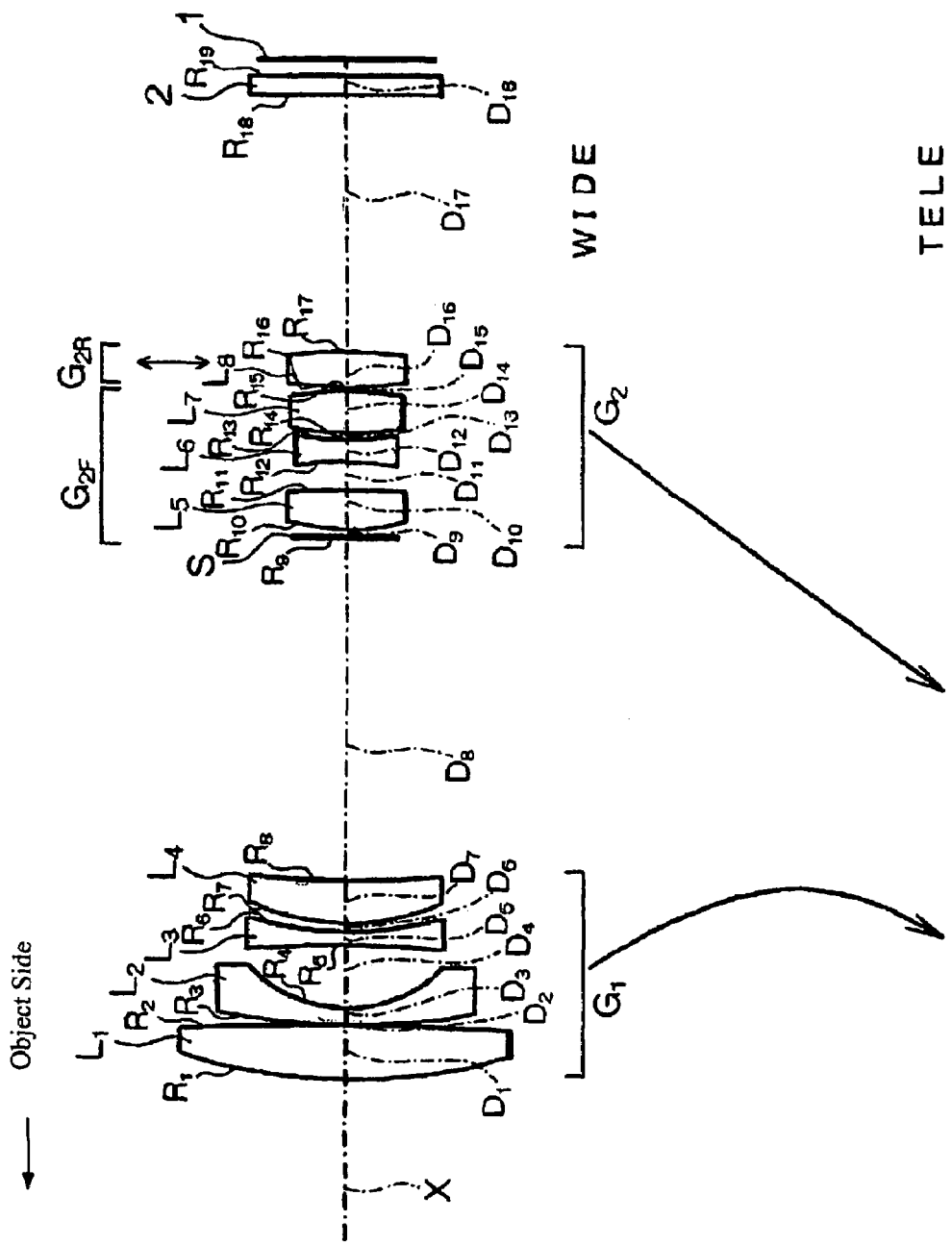
FIG. 1 shows a cross-sectional view of the zoom lens of Embodiment 1 of the present invention.

A general description of a zoom lens with a vibration-proof function of the present invention will first be described with reference to FIG. 1 that shows Embodiment 1. In FIG. 1, a horizontal arrow at the upper left labeled "Object side" points in the direction indicating the object side of the zoom lens. The opposite direction is the image side of the zoom lens. In FIG. 1, lens elements are referenced by the letter L with a subscript denoting their order from the object side of the zoom lens along the optical axis X, from $L_1$ to $L_8$. Similarly, the radii of curvature of the surfaces of the various optical elements, including the lens surfaces, are referenced by the letter R with a subscript denoting their order from the object side of the zoom lens, from $R_1$ to $R_{19}$. The on-axis surface spacings along the optical axis X of the various optical surfaces are referenced by the letter D with a subscript denoting their order from the object side of the zoom lens, from $D_1$ to $D_{18}$. In the same manner, two lens groups are labeled $G_1$ and $G_2$ in order from the object side of the zoom lens and the lens elements belonging to each lens group are indicated by the brackets adjacent the labels $G_1$ and $G_2$. Similarly, within lens group $G_2$, lens subgroups $G_{2F}$ and $G_{2R}$ are labeled in order from the object side of the zoom lens and the lens elements belonging to each lens subgroup are indicated by the brackets adjacent the labels $G_{2F}$ and $G_{2R}$.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that, during zooming, is movable as a single unit relative to another lens component or other lens components.

The term "lens subgroup" is defined herein as an assembly of one or more lens components in optical series and with no intervening lens components that make up less than the whole of a lens group with each lens component of the lens group belonging to only one of the lens subgroups.

As shown in FIG. 1, a stop S, such as a diaphragm, that controls the amount of light that passes through the zoom lens is included between the first lens group $G_1$ and the second lens group $G_2$ on the object side of the second lens group $G_2$. Also as shown in FIG. 1, a filter 2 that includes a cover glass of a solid state image pickup element and that provides infra-red and/or other filtering functions is arranged on the image side of the second lens group $G_2$.

As shown in FIG. 1, the first lens group $G_1$ has negative refractive power and the second lens group $G_2$ has positive refractive power, and the on-axis spacing between the first lens group $G_1$ and the second lens group $G_2$ is changed during zooming. More specifically, as shown by the downwardly pointing arrows in FIG. 1, when zooming from the wide-angle end to the telephoto end, the first lens group $G_1$ moves away from the object side of the zoom lens, which is toward the image side of the zoom lens, and then back toward the object side of the zoom lens while the second lens group $G_2$ monotonically moves toward the object side from the image side of the zoom lens.

The second lens group $G_2$ includes the first lens subgroup $G_{2F}$ having positive refractive power, which is the object side, front, or first lens subgroup, and the second lens subgroup $G_{2R}$ having positive refractive power, which is the image side, rear, or second lens subgroup. The filter 2 is arranged on the image side of the rear or second lens subgroup $G_{2R}$.

The rear or second lens subgroup $G_{2R}$ has a vibration-proof function for providing correction for hand shaking by offsetting the optical axis of the second lens subgroup $G_{2R}$ from the optical axis of the zoom lens so that the second lens subgroup $G_{2R}$ occupies an eccentric position relative to the optical axis of the zoom lens with the optical axis of the second lens subgroup $G_{2R}$ at a predetermined angle relative to the optical axis of the zoom lens, preferably parallel to the optical axis of the zoom lens. That is, as shown by the vertical double-headed arrow, the rear or second lens subgroup $G_{2R}$ preferably moves in a direction perpendicular to the optical axis of the zoom lens with the use of a device for moving the rear or second lens subgroup $G_{2R}$, which may be a conventional device.

For example, the device for moving the rear or second lens subgroup $G_{2R}$ may include a storage device built into a camera that includes the zoom lens and that stores information of the axial shift amount of the rear or second lens subgroup $G_{2R}$ needed for correcting the hand shaking. The amount of hand shaking is detected with an angular speed sensor arranged on the camera, and the rear or second lens subgroup $G_{2R}$ is moved by an actuator arranged in the zoom optical system in a direction at least approximately perpendicular to the optical axis X by an axial shift amount corresponding to the amount of hand shaking and correcting for it.

In the zoom lens having such a construction, a light beam incident along the optical axis from the object side is imaged at an imaging position on an image pickup plane of a solid state image pickup element such as a CCD (Charge-Coupled Device), all of which are indicated schematically by the reference numeral 1 in FIG. 1. When hand shaking occurs, the vibration-proof mechanism provides hand shaking correction by making the rear or second lens subgroup $G_{2R}$ move so that it becomes eccentrically parallel to the optical axis of the zoom lens with an eccentric offset of an appropriate amount for such correction.

This, combined with satisfying various conditions discussed below, enables obtaining good optical performance even if a large amount of hand shaking occurs, while reducing the load on a vibration-proof drive system and maintaining compactness by using a relatively lightweight lens subgroup as a hand-shaking correction lens subgroup.

Additionally, preferably the front or first lens subgroup $G_{2F}$ includes at least one lens element having positive refractive power and having at least one aspheric lens surface and at least one lens element having negative refractive power, and preferably the rear or second lens subgroup $G_{2R}$ does not include an aspheric lens surface.

This enables correcting almost all aberrations generated in the second lens subgroup $G_{2R}$ and reduces performance deterioration at the time of making the rear or second lens subgroup $G_{2R}$ eccentric to the optical axis of the zoom lens with its optical axis at a predetermined angle, preferably parallel, to the optical axis of the zoom lens.

Furthermore, preferably the second lens subgroup $G_{2R}$ consists of a single lens element having positive refractive power. This enables minimizing the weight of this second lens subgroup that is moved so that it is offset from the optical axis of the zoom lens with its own optical axis at a predetermined angle to the optical axis of the zoom lens, preferably parallel to the optical axis of the zoom lens, which reduces the load on the vibration-proof drive system. In this manner, the vibration-proof mechanism is simplified and compactness, light weight, and reduced costs can be achieved.

The lens surfaces that are aspheric are defined using the following Equation (A):

$$Z = [(Y^2/R)/\{1+(1-K\cdot Y^2/R^2)^{1/2}\}] + \Sigma(A_{2i}\cdot Y^{2i})  \quad \text{Equation (A)}$$

where
Z is the length (in mm) of a line drawn from a point on the aspheric lens surface at a distance Y from the optical axis to the tangential plane of the aspheric surface vertex,
R is the radius of curvature (in mm) of the aspheric lens surface on the optical axis,
Y is the distance (in mm) from the optical axis,
K is the eccentricity, and
$A_i$ is the ith aspheric coefficient, and the summation extends over i.

In embodiments of the invention disclosed below, only the aspheric coefficients $A_4$, $A_6$, $A_8$, and $A_{10}$ are non-zero.

Also, the zoom lens of the present invention satisfies the following Conditions (1) and (2):

$$0.5 < f_{2F}/f_{2R} < 1.0 \quad \text{Condition (1)}$$

$$-0.5 < \beta_{2RT} < 0.2 \quad \text{Condition (2)}$$

where
$f_{2F}$ is the focal length of the first lens subgroup,
$f_{2R}$ is the focal length of the second lens subgroup, and
$\beta_{2RT}$ is the transverse magnification of the second lens subgroup at the telephoto end of the zoom range.

If the lower limit of Condition (1) is not satisfied, the refractive power of the rear or second lens subgroup $G_{2R}$ is too small, and the amount of offset of the rear or second lens subgroup $G_{2R}$ from the optical axis of the zoom lens required to correct for hand shaking increases too much. Hence, more space for movement for such offset is required and compactness is lost. On the other hand, if the upper limit of Condition (1) is not satisfied, the refractive power of the rear or second lens subgroup $G_{2R}$ increases, and optical performance strikingly deteriorates when the rear or second lens subgroup $G_{2R}$ is offset to an eccentric position, for example, while maintaining its optical axis parallel to the optical axis of the zoom lens, in order to try to obtain correction for hand shaking. Thus, it is very difficult to obtain good optical performance.

If the lower limit of Condition (2) is not satisfied, the sensitivity of the rear or second lens subgroup $G_{2R}$ to deterioration of optical performance as it is offset from the optical axis of the zoom lens for hand shaking correction rises strikingly as it is offset, for example, while keeping its optical axis parallel to the optical axis of the zoom lens. On the other hand, if the upper limit of Condition (2) is not satisfied, the amount of offset of the rear or second lens subgroup $G_{2R}$ from the optical axis of the zoom lens required to correct for hand shaking increases too much. Hence, more space for movement for such offset is required and compactness is lost.

Additionally, preferably the zoom lens of the present invention also satisfies the following Condition (3):

$$2.5 < z < 4.5 \quad \text{Condition (3)}$$

where
z is the zoom ratio of the zoom lens.

If the lower limit of Condition (3) is not satisfied, the field angle at the telephoto end becomes larger, the minimum f-number decreases, and image blur caused by hand shaking occurs less readily at the telephoto end, thereby reducing the need for providing any vibration-proof function. Moreover, the zoom ratio is small, with the benefit of reducing the length of the zoom lens. On the other hand, if the upper limit of Condition (3) is not satisfied, the field angle at the telephoto end becomes smaller and movement of the image caused by hand shaking increases at the telephoto end so that image movement caused by hand shaking is not well corrected by such zoom lenses. Additionally, the amount of movement of the lens groups for zooming increases too much, so that compactness of the zoom lens is lost.

Embodiments 1–3 of the present invention will now be individually described with further reference to the drawings.

Embodiment 1

FIG. 1 shows a cross-sectional view of Embodiment 1 of the zoom lens of the present invention at the wide-angle end.

As shown in FIG. 1, Embodiment 1 includes, arranged in order along the optical axis X from the object side, first lens group $G_1$ and second lens group $G_2$. The first lens group $G_1$ includes, arranged in order along the optical axis X from the object side, a biconvex first lens element $L_1$, a second lens element $L_2$ of a meniscus shape, with negative refractive power, and having a convex surface on its object side, a biconcave third lens element $L_3$, and a fourth lens element $L_4$ of a meniscus shape, with positive refractive power, and having a concave surface on its image side.

The second lens group $G_2$ includes, arranged in order along the optical axis X from the object side, a biconvex fifth lens element $L_5$, a biconcave sixth lens element $L_6$, a biconvex seventh lens element $L_7$, and a biconvex eighth lens element $L_8$. The fifth, sixth, and seventh lens elements, $L_5$, $L_6$, and $L_7$, respectively, together form the front or first lens subgroup $G_{2F}$, and the eighth lens element $L_8$ forms the rear or second lens subgroup $G_{2R}$ with a vibration-proof function.

Table 1 below lists the surface number #, in order from the object side, the radius of curvature R (in mm) of each surface on the optical axis, the on-axis surface spacing D (in mm), as well as the refractive index $N_d$ and the Abbe number $v_d$ at the d-line (587.6 nm) of each optical element for Embodiment 1. Note that although R is the on-axis radius of curvature, for convenience of illustration, in FIG. 1 the lead lines from the R reference symbols extend to the surfaces being referenced but do not extend to the on-axis positions. Listed in the bottom portion of Table 1 are the focal length f and the f-number $F_{NO}$ at the wide-angle and telephoto ends, and the maximum field angle 2ω at the wide-angle end and the telephoto end for Embodiment 1.

TABLE 1

| # | R | D | $N_d$ | $v_d$ |
|---|---|---|---|---|
| 1 | 28.302 | 3.30 | 1.48749 | 70.4 |
| 2 | −299.754 | 0.15 | | |
| 3 | 33.287 | 1.00 | 1.83480 | 42.7 |
| 4 | 7.146 | 3.95 | | |
| 5 | −58.669 | 1.00 | 1.83480 | 42.7 |
| 6 | 17.887 | 0.50 | | |
| 7 | 13.141 | 2.55 | 1.84665 | 23.8 |
| 8 | 87.615 | D8 (variable) | | |
| 9 | ∞(stop) | 0.60 | | |
| 10 | 10.032 | 2.40 | 1.81600 | 46.6 |
| 11 | −284.129 | 1.83 | | |
| 12 | −17.070 | 1.60 | 1.80517 | 25.4 |
| 13 | 17.910 | 0.41 | | |
| 14* | 59.017 | 2.55 | 1.60969 | 57.7 |
| 15* | −22.201 | 0.30 | | |
| 16 | 24.376 | 2.20 | 1.51680 | 64.2 |
| 17 | −43.523 | D17 (variable) | | |
| 18 | ∞ | 1.10 | 1.51680 | 64.2 |
| 19 | ∞ | | | | f = 8.01–22.44 mm
$F_{NO}$ = 3.60–5.68
2ω = 64.5°–24.3°

The surfaces with a * to the right of the surface number in Table 1 are aspheric lens surfaces, and the aspheric surface shapes are expressed by Equation (A) above. As indicated in Table 1, both surfaces of the lens element $L_7$ of the second lens group $G_2$ are aspheric.

Table 2 below lists the values of the constant K and the aspheric coefficients $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_4$ | $A_6$ | $A_8$ | $A_{10}$ |
|---|---|---|---|---|---|
| 14 | 1.05322 | 2.52995E-4 | 1.57792E-5 | −1.34109E-7 | −5.63211E-10 |
| 15 | 0.63438 | 4.07598E-4 | 1.15722E-5 | 2.57739E-7 | 2.01375E-10 |

In the zoom lens of Embodiment 1, both the first lens group $G_1$ and the second lens group $G_2$ move during zooming. Therefore, the on-axis spacings D8 and D17 change with zooming. With zooming, the focal length f, the f-number $F_{NO}$, and the field angle, that is, the angle of view, 2ω of the zoom lens also change. Table 3 below lists the values of the focal length f (in mm), the f-number $F_{NO}$, the field angle 2ω (in degrees), and the variables D8 and D17 (in mm) at the wide-angle end (f=8.01 mm) and at the telephoto end (f=22.44 mm) when the zoom lens is focused at infinity.

TABLE 3

| f | $F_{NO}$ | 2ω | D8 | D17 |
|---|---|---|---|---|
| 8.01 | 3.60 | 64.5 | 21.36 | 17.08 |
| 22.44 | 5.68 | 24.3 | 3.19 | 33.24 |

In Embodiment 1, the correction for hand shaking that causes blurring of an image is made by moving the second lens subgroup $G_{2R}$ that consists of lens element $L_8$ so that the lens element is offset from the optical axis of the zoom lens with its optical axis parallel to the optical axis of the zoom lens. In particular, the second lens subgroup $G_{2R}$ is offset 0.103 mm when hand shaking in the amount of 0.3 degrees occurs at the telephoto end of the zoom range.

The zoom lens of Embodiment 1 of the present invention satisfies all of Conditions (1)–(3) above as set forth in Table 4 below.

TABLE 4

| Condition No. | Condition | Value |
|---|---|---|
| (1) | $0.5 < f_{2F}/f_{2R} < 1.0$ | 0.766 |
| (2) | $-0.5 < \beta_{2RT} < 0.2$ | −0.142 |
| (3) | $2.5 < z < 4.5$ | 2.800 |

Figure 6:
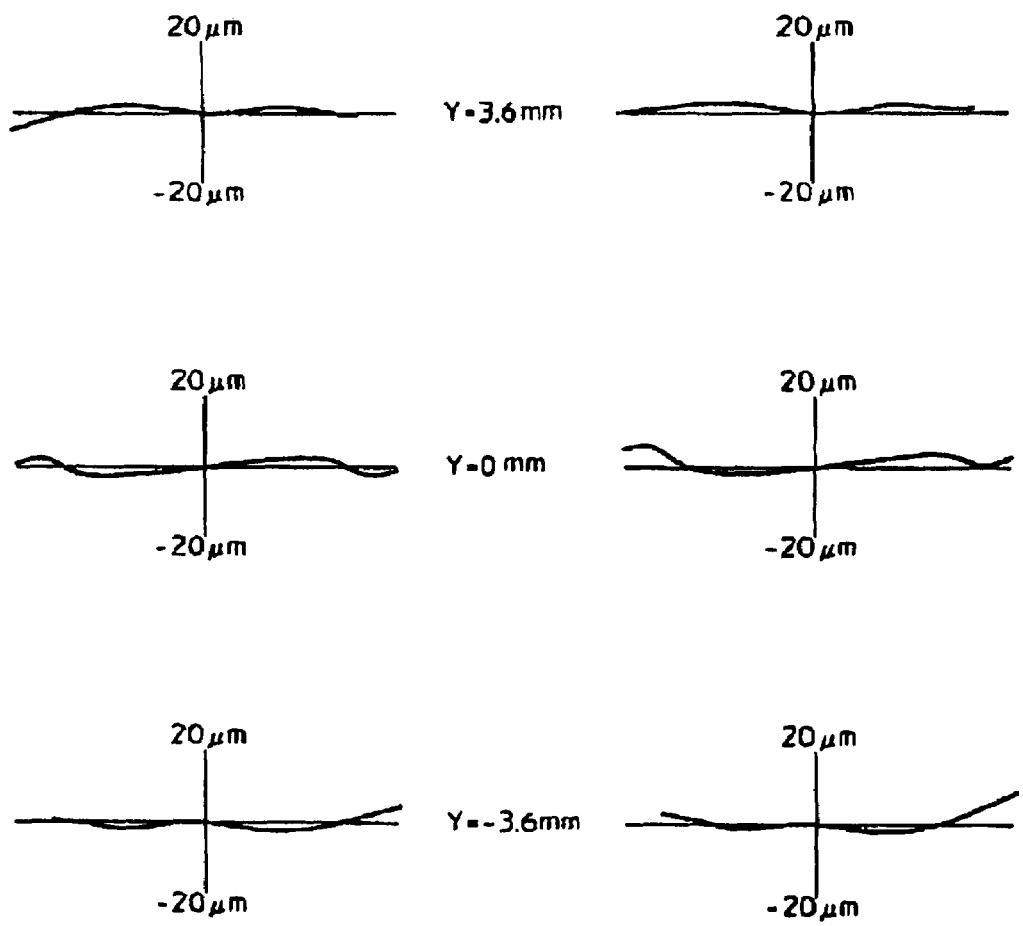
FIG. 6 shows the transverse aberrations of the zoom lens of Embodiment 1 of the present invention at the telephoto end.

FIGS. 4A–4C show the spherical aberration, astigmatism, and distortion, respectively, of the zoom lens of Embodiment 1 at the wide-angle end. FIGS. 5A–5C show the spherical aberration, astigmatism, and distortion, respectively, of the zoom lens of Embodiment 1 at the telephoto end. FIG. 6 shows the transverse aberrations of the zoom lens of Embodiment 1 of the present invention at the telephoto end. In FIGS. 4A and 5A, the spherical aberration (in mm) is shown for the wavelengths of 486.1 nm, 587.6 nm (the d-line) and 656.3 nm and the f-number is shown. In FIGS. 4B, 4C, 5B, 5C, and 6, Y represents the image height. In FIGS. 4B and 5B, the astigmatism (in mm) is shown for the sagittal image surface S and the tangential image surface T. In FIGS. 4C and 5C, distortion (in percent) is measured at 587.6 nm (the d-line). FIG. 6 shows the transverse aberrations for the case of no offset of the second lens subgroup $G_{2R}$ (left column) and the case of offset of the second lens subgroup $G_{2R}$ for hand shaking correction associated with an offset of 0.3 degrees (right column) at the telephoto end of the zoom range.

As is evident from FIGS. 4A–4C, 5A–5C, and 6, the zoom lens of Embodiment 1 favorably corrects aberrations and particularly can be used as a high performance zoom lens with good vibration correction at the telephoto end of the zoom range.

Embodiment 2

Figure 2:
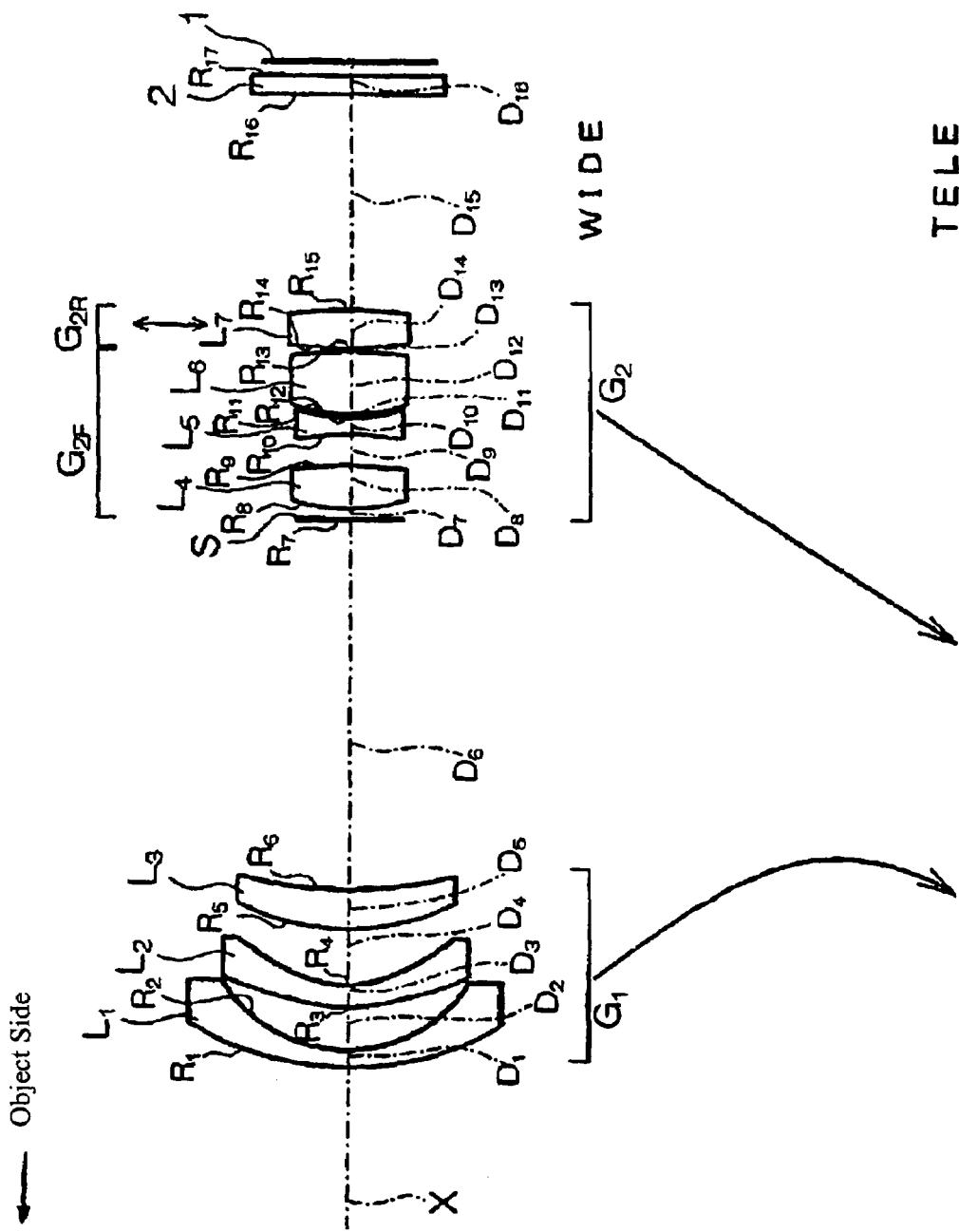
FIG. 2 shows a cross-sectional view of the zoom lens of Embodiment 2 of the present invention.

FIG. 2 shows a cross-sectional view of Embodiment 2 of the zoom lens of the present invention at the wide-angle end.

As shown in FIG. 2, Embodiment 2 includes, arranged in order along the optical axis X from the object side, a first lens group $G_1$ and a second lens group $G_2$. The first lens group $G_1$ includes, arranged in order along the optical axis X from the object side, a first lens element $L_1$ of a meniscus shape, with negative refractive power, and having a convex surface on its object side, a second lens element $L_2$ of a meniscus shape, with negative refractive power, and having a convex surface on its object side, and a third lens element $L_3$ of a meniscus shape, with positive refractive power, and having a convex surface on its object side.

The second lens group $G_2$ includes, arranged in order along the optical axis X from the object side, a biconvex fourth lens element $L_4$, a biconcave fifth lens element $L_5$, a biconvex sixth lens element $L_6$, and a biconvex seventh lens element $L_7$. The fourth, fifth, and sixth lens elements, $L_4$, $L_5$, and $L_6$, respectively, together form the front or first lens subgroup $G_{2F}$, and the seventh lens element $L_7$ forms the rear or second lens subgroup $G_{2R}$ with a vibration-proof function.

Table 5 below lists the surface number #, in order from the object side, the radius of curvature R (in mm) of each surface on the optical axis, the on-axis surface spacing D (in mm), as well as the refractive index $N_d$ and the Abbe number $v_d$ at the d-line (587.6 nm) of each optical element for Embodiment 2. Note that although R is the on-axis radius of curvature, for convenience of illustration, in FIG. 2 the lead lines from the R reference symbols extend to the surfaces being referenced but do not extend to the on-axis positions. Listed in the bottom portion of Table 5 are the focal length f and the f-number $F_{NO}$ at the wide-angle and telephoto ends, and the maximum field angle 2ω at the wide-angle end and the telephoto end for Embodiment 2.

TABLE 5

| # | R | D | $N_d$ | $v_d$ |
|---|---|---|---|---|
| 1 | 14.916 | 1.00 | 1.83480 | 42.7 |
| 2 | 7.690 | 2.85 | | |
| 3* | 9.910 | 1.20 | 1.80610 | 40.7 |
| 4* | 5.120 | 3.35 | | |
| 5 | 11.853 | 2.41 | 1.92285 | 20.9 |
| 6 | 20.858 | D6 (variable) | | |
| 7 | ∞(stop) | 0.60 | | |
| 8 | 7.533 | 2.55 | 1.62299 | 58.1 |
| 9 | −59.090 | 2.19 | | |
| 10 | −12.361 | 1.00 | 1.85000 | 32.4 |
| 11 | 10.004 | 0.20 | | |
| 12* | 7.550 | 3.75 | 1.52250 | 62.2 |
| 13* | −22.592 | 0.30 | | |
| 14 | 33.309 | 2.18 | 1.51823 | 58.9 |
| 15 | −29.430 | D15 (variable) | | |
| 16 | ∞ | 1.10 | 1.51680 | 64.2 |
| 17 | ∞ | | | | f = 6.41–17.93 mm
$F_{NO}$ = 3.60–5.47
2ω = 76.6°–30.2°

The surfaces with a * to the right of the surface number in Table 5 are aspheric lens surfaces, and the aspheric surface shapes are expressed by Equation (A) above. As indicated in Table 5, both surfaces of the lens element $L_2$ of the first lens group $G_1$ and both surfaces of the lens element $L_6$ of the second lens group $G_2$ are aspheric.

Table 6 below lists the values of the constant K and the aspheric coefficients $A_4$, $A_6$, $A_8$, and $A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_4$ | $A_6$ | $A_8$ | $A_{10}$ |
|---|---|---|---|---|---|
| 3 | −6.43837 | −2.08844E-4 | 1.00524E-5 | −1.54069E-7 | 1.09167E-9 |
| 4 | −1.62021 | 2.92750E-4 | 2.10973E-6 | −3.31974E-8 | −5.75841E-10 |
| 12 | −0.79753 | 3.80714E-4 | 1.63194E-5 | −8.20778E-8 | −2.33197E-9 |
| 13 | −1.14113 | 5.99438E-4 | 1.52532E-5 | 7.96453E-7 | 1.40396E-9 |

In the zoom lens of Embodiment 2, both the first lens group $G_1$ and the second lens group $G_2$ move during zooming. Therefore, the on-axis spacings D6 and D15 change with zooming. With zooming, the focal length f, the f-number $F_{NO}$, and the field angle, that is, the angle of view, 2ω of the zoom lens also change. Table 7 below lists the values of the focal length f (in mm), the f-number $F_{NO}$, the field angle 2ω (in degrees), and the variables D6 and D15 (in mm) at the wide-angle end (f=6.41 mm) and at the telephoto end (f=17.93 mm) when the zoom lens is focused at infinity.

TABLE 7

| f | $F_{NO}$ | 2ω | D6 | D15 |
|---|---|---|---|---|
| 6.41 | 3.60 | 76.6 | 22.62 | 14.09 |
| 17.93 | 5.47 | 30.2 | 3.20 | 28.06 |

In Embodiment 2, the correction for hand shaking that causes' blurring of an image is made by moving the second lens subgroup $G_{2R}$ that consists of lens element $L_7$ so that the lens element is offset from the optical axis of the zoom lens with its optical axis parallel to the optical axis of the zoom lens. In particular, the second lens subgroup $G_{2R}$ is offset 0.097 mm when hand shaking in the amount of 0.3 degrees occurs at the telephoto end of the zoom range.

The zoom lens of Embodiment 2 of the present invention satisfies all of Conditions (1)–(3) above as set forth in Table 8 below.

TABLE 8

| Condition No. | Condition | Value |
| --- | --- | --- |
| (1) | $0.5 < f_{2F}/f_{2R} < 1.0$ | 0.672 |
| (2) | $-0.5 < \beta_{2RT} < 0.2$ | 0.034 |
| (3) | $2.5 < z < 4.5$ | 2.800 |

Figure 7A:
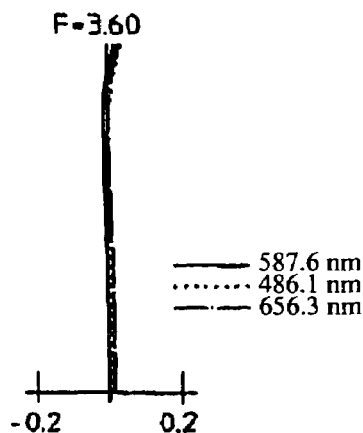
FIGS. 7A–7C show the spherical aberration, astigmatism, and distortion, respectively, of the zoom lens of Embodiment 2 of the present invention at the wide-angle end.
Figure 7B:
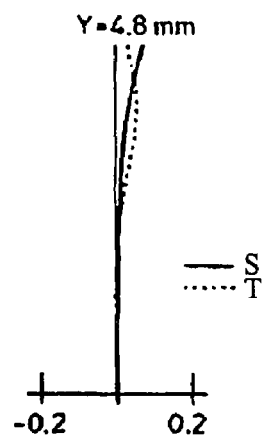
Figure 7C:
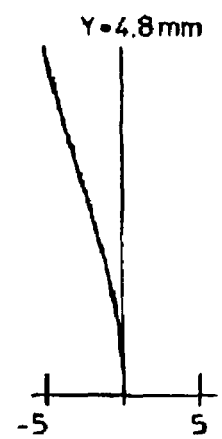
Figure 8A:
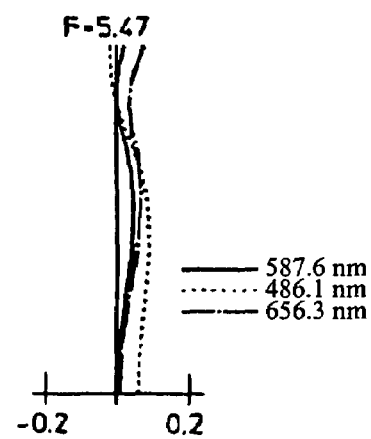
FIGS. 8A–8C show the spherical aberration, astigmatism, and distortion, respectively, of the zoom lens of Embodiment 2 of the present invention at the telephoto end.
Figure 8B:
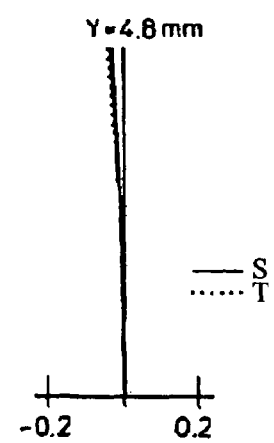
Figure 8C:
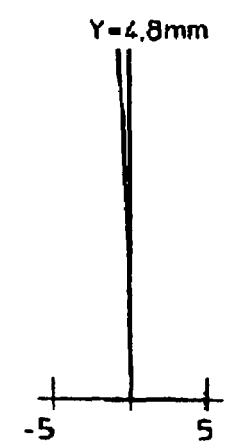
Figure 9:
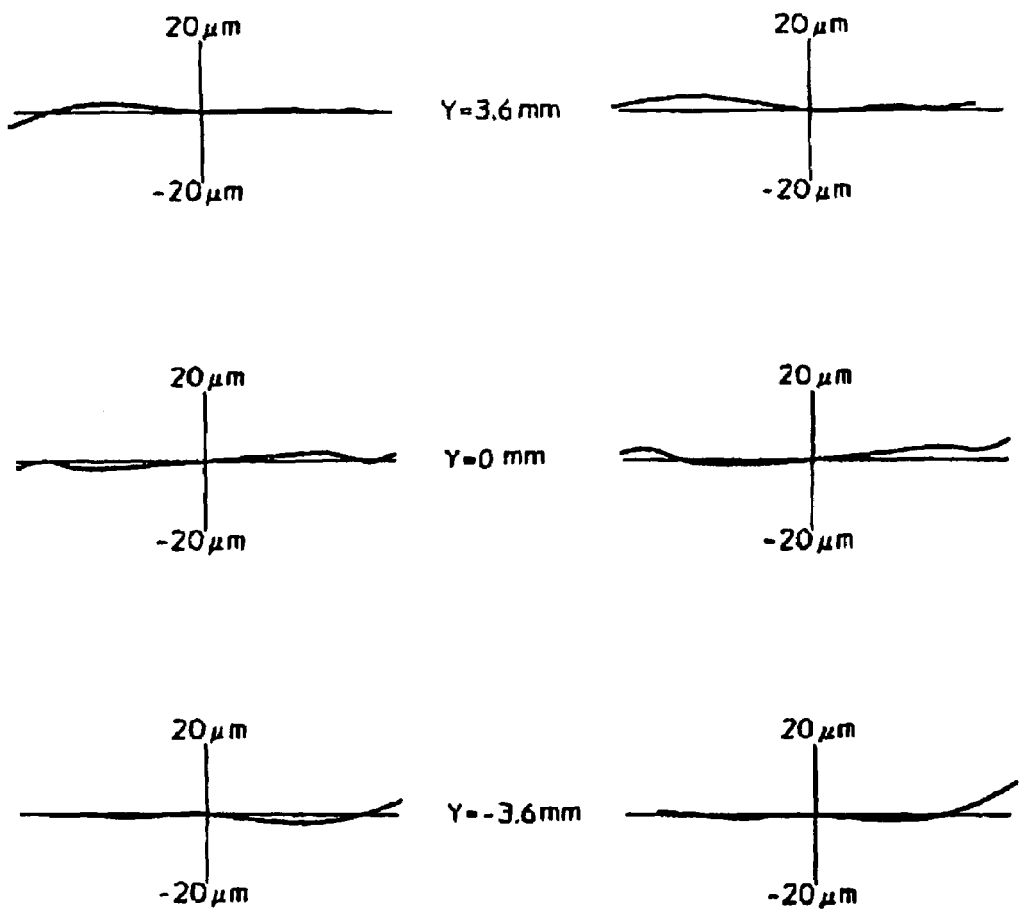
FIG. 9 shows the transverse aberrations of the zoom lens of Embodiment 2 of the present invention at the telephoto end.

FIGS. 7A–7C show the spherical aberration, astigmatism, and distortion, respectively, of the zoom lens of Embodiment 2 at the wide-angle end. FIGS. 8A–8C show the spherical aberration, astigmatism, and distortion, respectively, of the zoom lens of Embodiment 2 at the telephoto end. FIG. 9 shows the transverse aberrations of the zoom lens of Embodiment 2 of the present invention at the telephoto end. In FIGS. 7A and 8A, the spherical aberration (in mm) is shown for the wavelengths of 486.1 nm, 587.6 nm (the d-line) and 656.3 nm and the f-number is shown. In FIGS. 7B, 7C, 8B, 8C, and 9, Y represents the image height. In FIGS. 7B and 8B, the astigmatism (in mm) is shown for the sagittal image surface S and the tangential image surface T. In FIGS. 7C and 8C, distortion (in percent) is measured at 587.6 nm (the d-line). FIG. 9 shows the transverse aberrations for the case of no offset of the second lens subgroup $G_{2R}$ (left column) and the case of offset of the second lens subgroup $G_{2R}$ for hand shaking correction associated with an offset of 0.3 degrees (right column) at the telephoto end of the zoom range.

As is evident from FIGS. 7A–7C, 8A–8C, and 9, the zoom lens of Embodiment 2 favorably corrects aberrations and particularly can be used as a high performance zoom lens with good vibration correction at the telephoto end of the zoom range.

Embodiment 3

Figure 3:
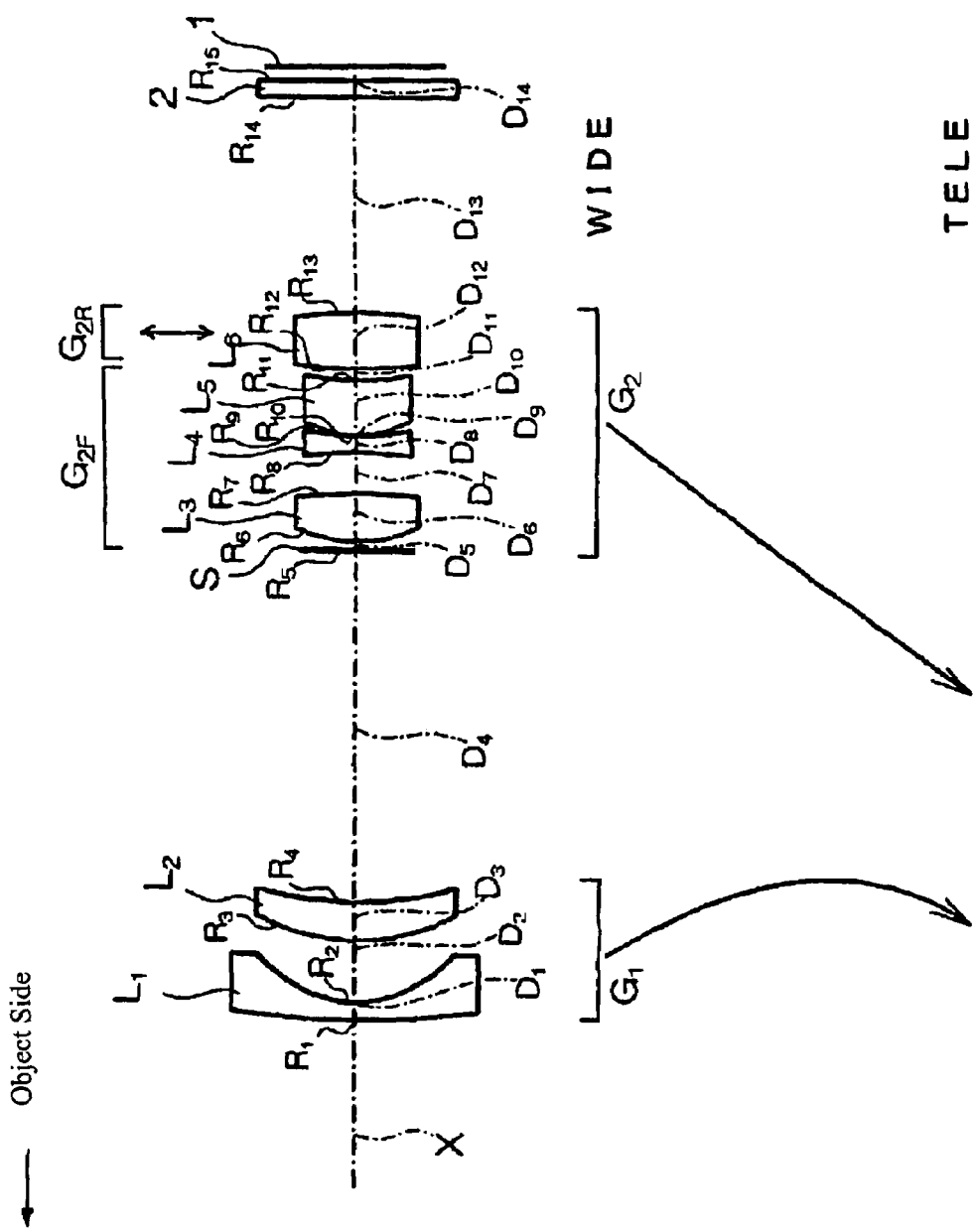
FIG. 3 shows a cross-sectional view of the zoom lens of Embodiment 3 of the present invention.

FIG. 3 shows a cross-sectional view of Embodiment 3 of the zoom lens of the present invention at the wide-angle end.

As shown in FIG. 3, Embodiment 3 includes, arranged in order along the optical axis X from the object side, first lens group $G_1$ and second lens group $G_2$. The first lens group $G_1$ includes, arranged in order along the optical axis X from the object side, a first lens element $L_1$ of a meniscus shape, with negative refractive power, and having a convex surface on its object side, and a second lens element $L_2$ of a meniscus shape, with negative refractive power, and having a convex surface on its object side.

The second lens group $G_2$ includes, arranged in order along the optical axis X from the object side, a biconvex third lens element $L_3$, a biconcave fourth lens element $L_4$, a meniscus fifth lens element $L_5$, and a biconvex sixth lens element $L_6$. The third, fourth, and fifth lens elements, $L_3$, $L_4$, and $L_5$, respectively, together form the front or first lens subgroup $G_{2F}$, and the sixth lens element $L_6$ forms the rear or second lens subgroup $G_{2R}$ with a vibration-proof function.

Table 9 below lists the surface number #, in order from the object side, the radius of curvature R (in mm) of each surface on the optical axis, the on-axis surface spacing D (in mm), as well as the refractive index $N_d$ and the Abbe number $v_d$ at the d-line (587.6 nm) of each optical element for Embodiment 3. Note that although R is the on-axis radius of curvature, for convenience of illustration, in FIG. 3 the lead lines from the R reference symbols extend to the surfaces being referenced but do not extend to the on-axis positions. Listed in the bottom portion of Table 9 are the focal length f and the f-number $F_{NO}$ at the wide-angle and telephoto ends, and the maximum field angle $2\omega$ at the wide-angle end and the telephoto end for Embodiment 3.

TABLE 9

| # | R | D | $N_d$ | $v_d$ |
| --- | --- | --- | --- | --- |
| 1* | 33.331 | 1.20 | 1.80610 | 40.7 |
| 2* | 5.716 | 3.75 | | |
| 3 | 11.497 | 2.20 | 1.92285 | 20.9 |
| 4 | 18.944 | D4 (variable) | | |
| 5 | ∞(stop) | 0.60 | | |
| 6 | 6.506 | 2.86 | 1.51680 | 64.2 |
| 7 | −80.182 | 2.48 | | |
| 8 | −12.075 | 1.00 | 1.80517 | 25.4 |
| 9 | 10.898 | 0.20 | | |
| 10* | 7.768 | 3.40 | 1.72249 | 29.2 |
| 11* | 46.635 | 0.50 | | |
| 12 | 26.831 | 3.40 | 1.51823 | 58.9 |
| 13 | −24.552 | D13 (variable) | | |
| 14 | ∞ | 1.10 | 1.51680 | 64.2 |
| 15 | ∞ | | | | f = 8.01–22.42 mm
$F_{NO}$ = 3.60–5.74
$2\omega$ = 64.6°–24.2°

The surfaces with a * to the right of the surface number in Table 9 are aspheric lens surfaces, and the aspheric surface shapes are expressed by Equation (A) above. As indicated in Table 9, both surfaces of the lens elements $L_1$ of the first lens group $G_1$ and both surfaces of the lens element $L_5$ of the second lens group $G_2$ are aspheric.

Table 10 below lists the values of the constant K and the aspheric coefficients $A_4$, $A_6$, $A_8$, and $A_{10}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E-2" represents the number $1.0 \times 10^{-2}$.

TABLE 10

| # | K | $A_4$ | $A_6$ | $A_8$ | $A_{10}$ |
| --- | --- | --- | --- | --- | --- |
| 1 | 0.97526 | −8.64877E-5 | −1.89488E-7 | 1.26071E-8 | −7.45148E-11 |
| 2 | 0.34589 | −4.78927E-5 | −3.45835E-6 | 3.87776E-8 | −1.08779E-11 |
| 10 | −0.17029 | 2.24115E-7 | −1.80341E-6 | −7.38519E-7 | −3.09217E-9 |
| 11 | −0.55133 | 6.45269E-4 | 7.99282E-6 | −6.32758E-7 | −5.58905E-9 |

In the zoom lens of Embodiment 3, both the first lens group $G_1$ and the second lens group $G_2$ move during zooming. Therefore, the on-axis spacings D4 and D13 change with zooming. With zooming, the focal length f, the f-number $F_{NO}$, and the field angle, that is, the angle of view, $2\omega$ of the zoom lens also change. Table 11 below lists the values of the focal length f (in mm), the f-number $F_{NO}$, the field angle $2\omega$ (in degrees), and the variables D4 and D13 (in mm)

at the wide-angle end (f=8.01 mm) and at the telephoto end (f=22.42 mm) when the zoom lens is focused at infinity.

TABLE 11

| f | $F_{NO}$ | 2ω | D4 | D13 |
|---|---|---|---|---|
| 8.01 | 3.60 | 64.6 | 21.32 | 13.87 |
| 22.42 | 5.74 | 24.2 | 3.20 | 29.83 |

In Embodiment 3, the correction for hand shaking that causes blurring of an image is made by moving the second lens subgroup $G_{2R}$ that consists of lens element $L_6$ so that the lens element is offset from the optical axis of the zoom lens with its optical axis parallel to the optical axis of the zoom lens. In particular, the second lens subgroup $G_{2R}$ is offset 0.094 mm when hand shaking in the amount of 0.3 degrees occurs at the telephoto end of the zoom range.

The zoom lens of Embodiment 3 of the present invention satisfies Conditions (1)–(3) above as set forth in Table 12 below.

TABLE 12

| Condition No. | Condition | Value |
|---|---|---|
| (1) | $0.5 < f_{2F}/f_{2R} < 1.0$ | 0.855 |
| (2) | $-0.5 < \beta_{2RT} < 0.2$ | -0.250 |
| (3) | $2.5 < z < 4.5$ | 2.800 |

Figure 10A:
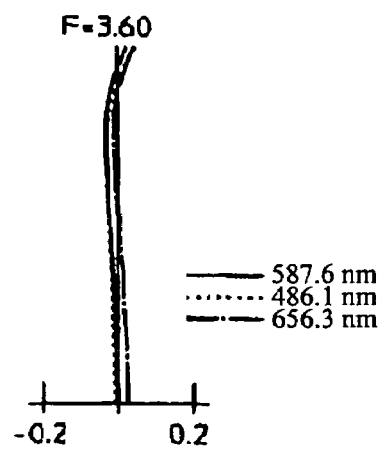
FIGS. 10A–10C show the spherical aberration, astigmatism, and distortion, respectively, of the zoom lens of Embodiment 3 of the present invention at the wide-angle end.
Figure 10B:
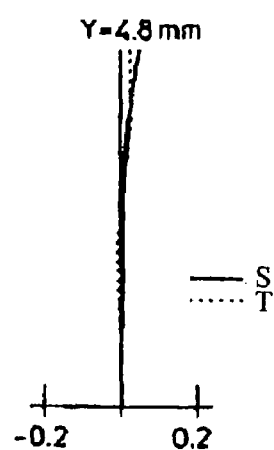
Figure 10C:
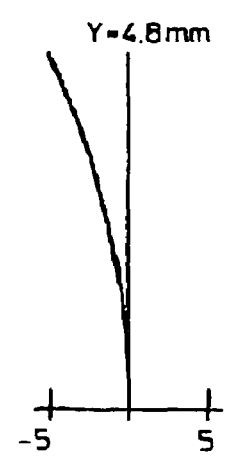
Figure 11A:
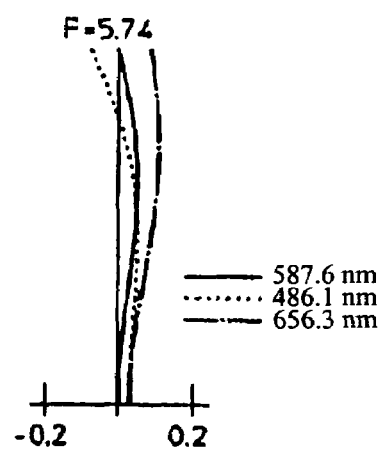
FIGS. 11A–11C show the spherical aberration, astigmatism, and distortion, respectively, of the zoom lens of Embodiment 3 of the present invention at the telephoto end.
Figure 11B:
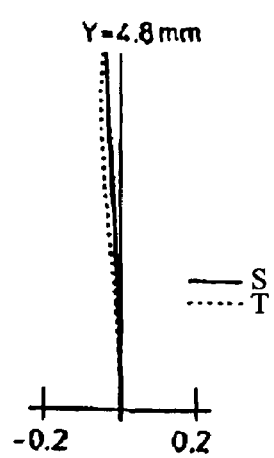
Figure 11C:
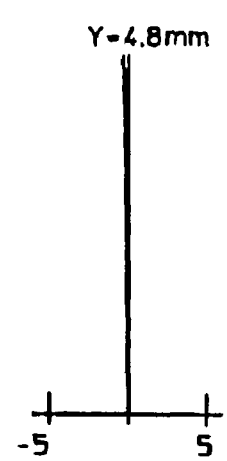
Figure 12:
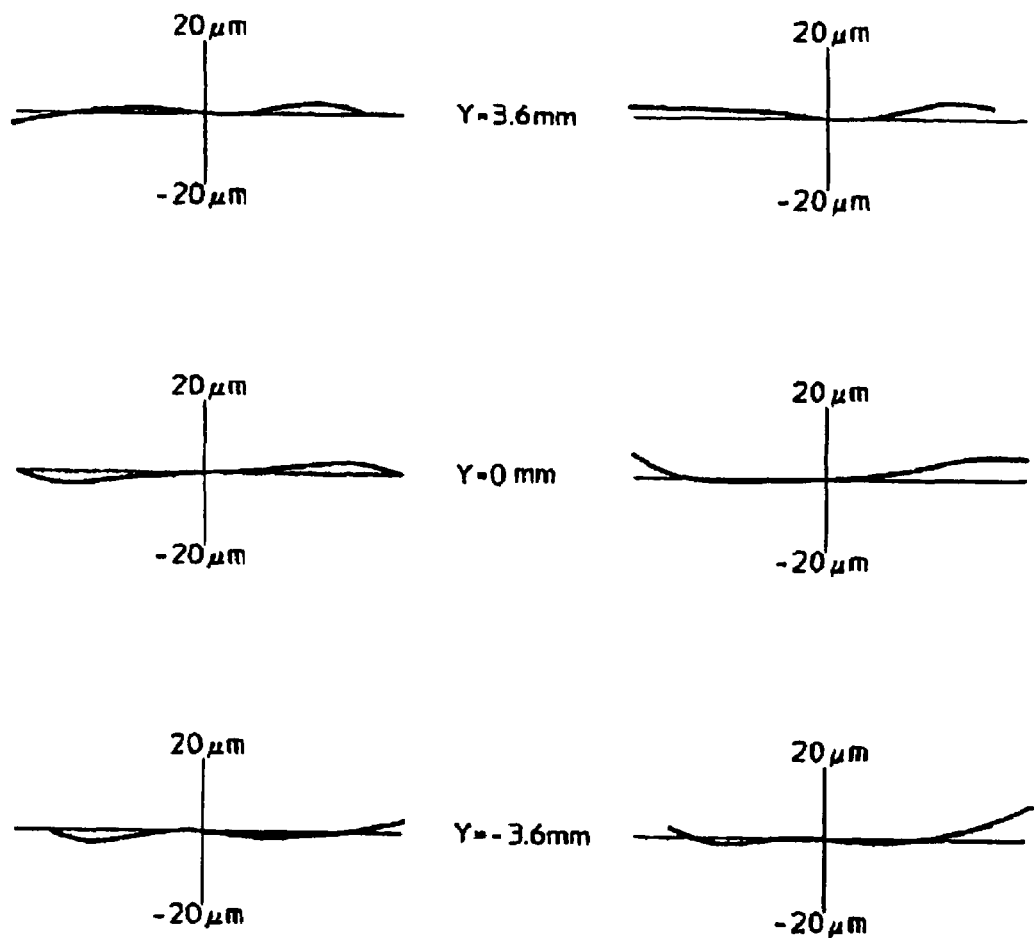
FIG. 12 shows the transverse aberrations of the zoom lens of Embodiment 3 of the present invention at the telephoto end.

FIGS. 10A–10C show the spherical aberration, astigmatism, and distortion, respectively, of the zoom lens of Embodiment 3 at the wide-angle end. FIGS. 11A–11C show the spherical aberration, astigmatism, and distortion, respectively, of the zoom lens of Embodiment 3 at the telephoto end. FIG. 12 shows the transverse aberrations of the zoom lens of Embodiment 3 of the present invention at the telephoto end. In FIGS. 10A and 11A, the spherical aberration (in mm) is shown for the wavelengths of 486.1 nm, 587.6 nm (the d-line) and 656.3 nm and the f-number is shown. In FIGS. 10B, 10C, 11B, 11C, and 12, Y represents the image height. In FIGS. 10B and 11B, the astigmatism (in mm) is shown for the sagittal image surface S and the tangential image surface T. In FIGS. 10C and 11C, distortion (in percent) is measured at 587.6 nm (the d-line). FIG. 12 shows the transverse aberrations for the case of no offset of the second lens subgroup $G_{2R}$ (left column) and the case of offset of the second lens subgroup $G_{2R}$ for hand shaking correction associated with an offset of 0.3 degrees (right column) at the telephoto end of the zoom range.

As is evident from FIGS. 10A–10C, 11A–11C, and 12, the zoom lens of Embodiment 3 favorably corrects aberrations and particularly can be used as a high performance zoom lens with good vibration correction at the telephoto end of the zoom range.

The present invention is not limited to the aforementioned embodiments, as it will be obvious that various alternative implementations are possible. For instance, values such as the radius of curvature R of each of the lens components, the surface spacings D, the refractive index N, as well as the Abbe number v, are not limited to the examples indicated in each of the aforementioned embodiments, as other values can be adopted. The second lens group $G_2$ may include both positive and negative lens elements. Also, another lens group can be arranged on the image side of the second lens group $G_2$. At least one surface of a lens element of the front or first lens subgroup $G_{2F}$ should be aspheric.

In zoom lenses of the present invention, as shown by Embodiments 1–3 described above, the vibration-proof mechanism is simplified, and hand shaking correction is accomplished by making the rear or second lens subgroup $G_{2R}$ movable so as to be offset from the optical axis of the zoom lens with its optical axis parallel to the optical axis of the zoom lens in order to make the zoom lens lighter and reduce costs. However, hand shaking correction can also be obtained by making the rear or second lens subgroup $G_{2R}$ so as to be offset with its optical axis at a nonzero angle, that is, not parallel to the optical axis of the zoom lens.

Additionally, the zoom lens with a vibration-proof function of the present invention is suitable as an optical system of a small and lightweight digital camera with a zoom ratio of about three in which an image is formed on a solid state image pickup element, and it can also be used as an optical system in other types of cameras or other optical systems, such as, for example, binocular telescopes.

Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens with a vibration-proof function comprising, arranged along an optical axis in order from the object side as follows:
   a first lens group having negative refractive power; and
   a second lens group having positive refractive power; wherein
   the distance along the optical axis between the first lens group and the second lens group changes during zooming;
   the second lens group includes a first lens subgroup on its object side having positive refractive power and a second lens subgroup having positive refractive power;
   at least one lens surface of the first lens subgroup is an aspheric surface;
   the second lens subgroup is movable in a direction perpendicular to the optical axis in order to correct for vibration of the zoom lens; and
   the following conditions are satisfied:

$0.5 < f_{2F}/f_{2R} < 1.0$ $-0.5 < \beta_{2RT} < 0.2$ where
   $f_{2F}$ is the focal length of said first lens subgroup,
   $f_{2R}$ is the focal length of said second lens subgroup, and
   $\beta_{2RT}$ is the transverse magnification of said second lens subgroup at the telephoto end of the zoom range.

2. The zoom lens of claim 1, wherein:
   said first lens subgroup includes a lens element having positive refractive power and a lens element having negative refractive power;
   said lens element having positive refractive power includes at least one aspheric surface; and
   said second lens subgroup includes at least one lens element that does not include an aspheric surface.

3. The zoom lens of claim 1, wherein said second lens subgroup consists of a lens element having positive refractive power.

4. The zoom lens of claim 2, wherein said second lens subgroup consists of a lens element having positive refractive power.

5. The zoom lens of claim 1, wherein the following condition is satisfied:

$$2.5 < z < 4.5$$

where z is the zoom ratio of the zoom lens.

6. The zoom lens of claim 2, wherein the following condition is satisfied:

$$2.5 < z < 4.5$$

where z is the zoom ratio of the zoom lens.

7. The zoom lens of claim 3, wherein the following condition is satisfied:

$$2.5 < z < 4.5$$

where z is the zoom ratio of the zoom lens.

8. The zoom lens of claim 4, wherein the following condition is satisfied:

$$2.5 < z < 4.5$$

where z is the zoom ratio of the zoom lens.

9. The zoom lens of claim 1, wherein the second lens subgroup is movable in a direction perpendicular to the optical axis in order to correct for vibration so that the optical axis of the second lens subgroup is offset from and parallel to the optical axis of the zoom lens.

10. The zoom lens of claim 2, wherein the second lens subgroup is movable in a direction perpendicular to the optical axis in order to correct for vibration so that the optical axis of the second lens subgroup is offset from and parallel to the optical axis of the zoom lens.

11. The zoom lens of claim 3, wherein the second lens subgroup is movable in a direction perpendicular to the optical axis in order to correct for vibration so that the optical axis of the second lens subgroup is offset from and parallel to the optical axis of the zoom lens.

12. The zoom lens of claim 4, wherein the second lens subgroup is movable in a direction perpendicular to the optical axis in order to correct for vibration so that the optical axis of the second lens subgroup is offset from and parallel to the optical axis of the zoom lens.

13. The zoom lens of claim 5, wherein the second lens subgroup is movable in a direction perpendicular to the optical axis in order to correct for vibration so that the optical axis of the second lens subgroup is offset from and parallel to the optical axis of the zoom lens.

14. The zoom lens of claim 1, wherein the zoom lens forms an image on a solid state image pickup element.

15. The zoom lens of claim 2, wherein the zoom lens forms an image on a solid state image pickup element.

16. The zoom lens of claim 3, wherein the zoom lens forms an image on a solid state image pickup element.

17. The zoom lens of claim 4, wherein the zoom lens forms an image on a solid state image pickup element.

18. The zoom lens of claim 5, wherein the zoom lens forms an image on a solid state image pickup element.

19. The zoom lens of claim 6, wherein the zoom lens forms an image on a solid state image pickup element.

20. The zoom lens of claim 9, wherein the zoom lens forms an image on a solid state image pickup element.

* * * * *